United States Patent [19]
Akagiri

[11] Patent Number: 5,491,481
[45] Date of Patent: Feb. 13, 1996

[54] COMPRESSED DIGITAL DATA RECORDING AND REPRODUCING APPARATUS WITH SELECTIVE BLOCK DELETION

[75] Inventor: Kenzo Akagiri, Kanagawa, Japan

[73] Assignee: Sony Corporation, Tokyo, Japan

[21] Appl. No.: 153,035

[22] Filed: Nov. 17, 1993

[30] Foreign Application Priority Data

Nov. 26, 1992 [JP]  Japan .................................. 4-317215

[51] Int. Cl.⁶ ............................................... H03M 7/30
[52] U.S. Cl. ............................................ 341/87; 395/2.21
[58] Field of Search ................... 395/2.21, 2.24, 395/2.2

[56] References Cited

U.S. PATENT DOCUMENTS

| | | | |
|---|---|---|---|
| 4,916,742 | 4/1990 | Kolesnikov et al. | 381/30 |
| 4,989,246 | 1/1991 | Wan et al. | 395/2.21 |
| 5,054,073 | 10/1991 | Yazu | 395/2.21 |

FOREIGN PATENT DOCUMENTS 4-304030  10/1992  Japan ............................ H03M 7/30

OTHER PUBLICATIONS

EPO Search Report; Patent Abstracts of Japan, vol. 17, No. 128, Mar. 18, 1993 Database WPI, Section Ei, Week 9302; Patent Abstracts of Japan, vol. 17 No. 287, Jun. 2, 1993.

Primary Examiner—Howard L. Williams
Attorney, Agent, or Firm—Ronald P. Kananen

[57] ABSTRACT

A compressed data recording and/or reproducing apparatus has a compressed data reproducing system for at least reproducing digital data from one recording medium such as a magneto-optical disc in which digital data is bit-compressed and recorded and a compressed data recording system for at least recording digital data in one other recording medium such as an IC card in which digital data is bit-compressed and recorded. The compressed data recorded in the one recording medium of the reproducing system is reproduced and transmitted to the recording system. The compressed data is also bit-compressed at the same or a lower bit rate and recorded in the other recording medium. For this recording, a processing block of the bit compression is selectively deleted in accordance with a scale factor of the bit, compression.

29 Claims, 11 Drawing Sheets

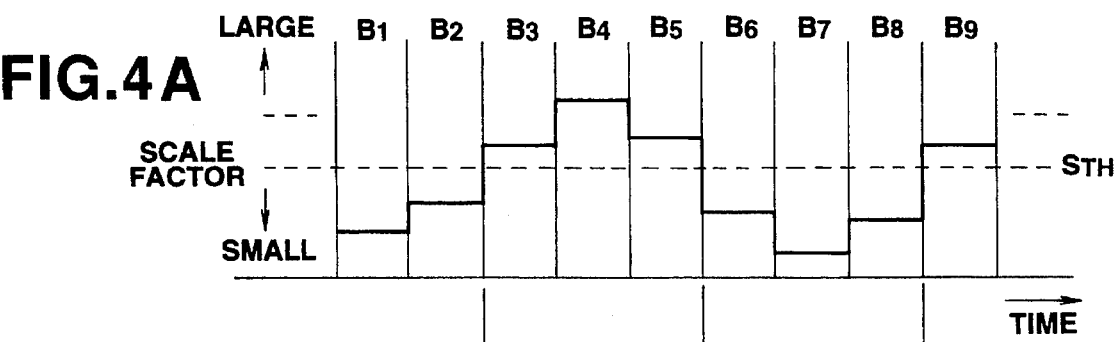
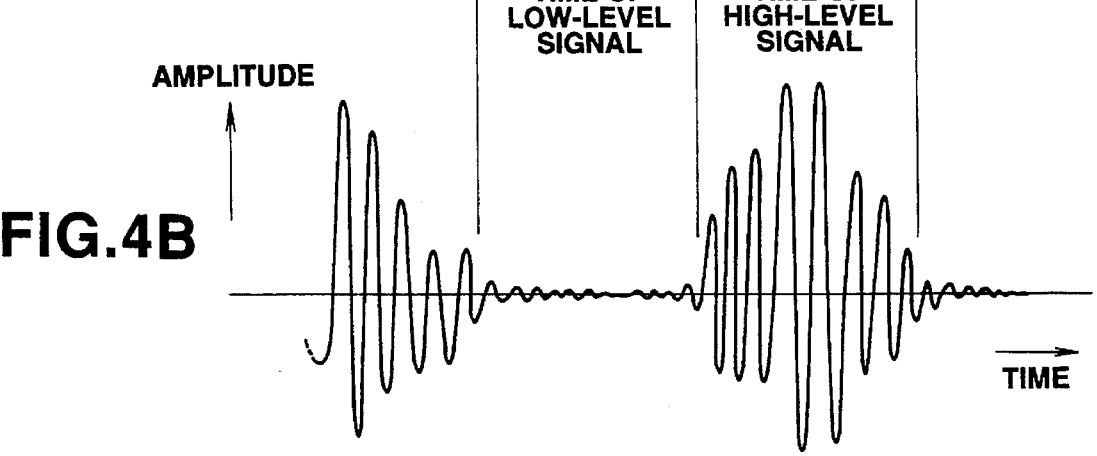

COMPRESSED DIGITAL DATA RECORDING AND REPRODUCING APPARATUS WITH SELECTIVE BLOCK DELETION

BACKGROUND OF THE INVENTION

1. Field of the Invention

This invention relates to a recording/reproducing apparatus for compressed data produced by bit-compressing digital audio signals, and more particularly, is directed to a compressed data recording and/or reproducing apparatus for transmitting data between compressed signal recording media and recording them.

2. Description of the Related Art

The present Assignee has proposed in e.g. the specification and drawings of the currently pending U.S. patent application Ser. No. 07/746,787, filed on Aug. 16, 1991, a technique of bit-compressing input digital audio signals and recording the bit-compressed signals in a burst-like manner with a predetermined data volume as a recording unit.

In this technique, a magneto-optical disc is used as a recording medium for recording/reproducing adaptive differential (AD) PCM audio data, as prescribed in a so-called CD-I (CD-Interactive) or CD-ROM XA audio data format. These ADPCM data are recorded in a burst-like manner in the magnet-optical disc, with e.g. 32 sectors of the ADPCM data and several linking sectors as a recording unit, the linking sectors being used for interleaving.

Several modes may be selected for ADPCPM audio data in the recording/reproducing apparatus employing the magneto-optical disc. For example, levels A, B and C are prescribed, with level A having the compression rate twice that of the usual CD playback time, level B having the compression rate four times thereof, and level C having the compression rate eight times thereof. That is, for level B, for example, digital audio data are compressed to about one-fourth so that the reproduction time of the disc in which the data are recorded in this level B mode is four times that of the standard CD format (CD-DA format). This leads to accomplishment of a small-sized apparatus because the recording reproduction time comparable to that in a standard 12 cm disc may be realized with a disc of a smaller size.

However, since the rotational speed of the disc is the same as that of a standard CD, the volume of compressed data per unit time is four times the data volume corresponding to the reproduction time for the level B. For this reason, the same compressed data are read four times per unit time of a sector or a cluster and only compressed data corresponding to one reading is sent to an audio playback system. Specifically, when scanning or tracking a spirally extending recording track, track jump is carried out in the course of reproduction so that the optical head is returned to the original track position after each complete rotation, thereby implementing reproducing operation in such a manner that tracking of the same track is repeated four times. This operation mode is preferable when used in, above all, a small-sized portable system, because it suffices to produce accurate compressed data in at least one of the four repeated readout operations, so that the operation is strong against errors due to external disturbances or the like.

In the future, semiconductor memories are expected to be used as recording media. Thus, for further improving the compressibility, it is desirable to carry out additional bit compression. Specifically, audio signals are recorded and/or reproduced using so-called IC cards. Bit-compressed data are recorded in and reproduced from the IC card. The present Assignee has proposed a system employing this IC card, in the U.S. patent application Ser. No. 07/931,790, filed on Aug. 18, 1992.

Although an increase in the recording capacity and a reduction in costs of the IC card employing such a semiconductor memory are expected to be achieved with a progress in the semiconductor technology, there is a fear that the IC card, which has barely started to be supplied to the market, is expensive and short of capacity. Therefore, it may be conceived to transfer to the IC card the contents of other less expensive recording media of a larger capacity, such as a magneto-optical disc, by way of data exchange and re-recording operations. Specifically, a desired one of plural airs recorded in the magneto-optical disc may be dubbed into the IC card, and may be replaced by other air(s) whenever desirable. By repeatedly exchanging the contents of the IC card, a variety of airs may be played outdoors using a small number of IC cards on hand.

Meanwhile, when some of the plural airs recorded in the magneto-optical disc are to be dubbed into the IC card, it is necessary to reduce the operation volume in order to achieve high-speed dubbing and economization.

OBJECT AND SUMMARY OF THE INVENTION

In view of the above-described status of the art, the object of the present invention is to provide a compressed data recording and/or reproducing apparatus whereby a small volume of operation suffices for dubbing bit-compressed data from one recording medium such as the magneto-optical disc into another recording medium such as the IC card, or for reproducing the bit-compressed data from the latter recording medium such as the IC card.

It is another object of the present invention to compensate the small recording capacity of the latter recording medium such as the IC card, for recording data for a longer time.

It is another object of the present invention to elongate the recording time, with effective use of a memory. It is still another object of the present invention to shorten the reproduction time when compressed data from a first recording medium such as the magneto-optical disc or a second recording medium such as the IC card are bit-expanded so as to produce reproduction signals.

According to the present invention, there is provided a compressed data recording and/or reproducing apparatus in which processing operation volume can be reduced by implementing additional compression for dubbing without implementing bit expansion when dubbing bit-compressed data from one recording medium such as a magneto-optical disc into another recording medium such as an IC card.

Also, for effective use of recording capacity of the latter recording medium such as the IC card, it is useful to delete processing blocks of bit compression for selective recording, by means of a bit compression parameter.

In addition, when bit-compressed data are to be bit-expanded from the recording medium so as to produce reproduction signals, a reproduction time can be shortened by deleting processing blocks of bit compression for selective reproduction, by means of the bit compression parameter.

With the compressed data recording and/or reproducing apparatus according to the present invention, a small operation volume suffices because compressed data recorded in one recording medium are recorded, directly or being processed with additional compression, into another recording medium, without being expanded. Thus, so-called high-speed dubbing corresponding to the compressibility can be carried out. Also, since the bit compression processing block which is deleted by means of the bit compression parameter is provided, it is possible to elongate the recording time and shorten the reproduction time. Thus, information to be stored can be recorded with effective use of the recording capacity. At the same time, bit compression processing blocks which need not be recorded can be selectively found by means of the bit compression parameter. In addition, the reproduction time can shortened in reproduction from the recording medium, thereby saving time.

The above, and other objects, features and advantages of the invention, will be apparent in the following description of a preferred embodiment thereof which is to be read in connection with the accompanying drawings.

BRIEF DESCRIPTION OF THE DRAWINGS

FIGS. 4A and 4B is view showing temporal changes of a scale factor and temporal changes of an input signal.

DESCRIPTION OF THE PREFERRED EMBODIMENT

Figure 1:
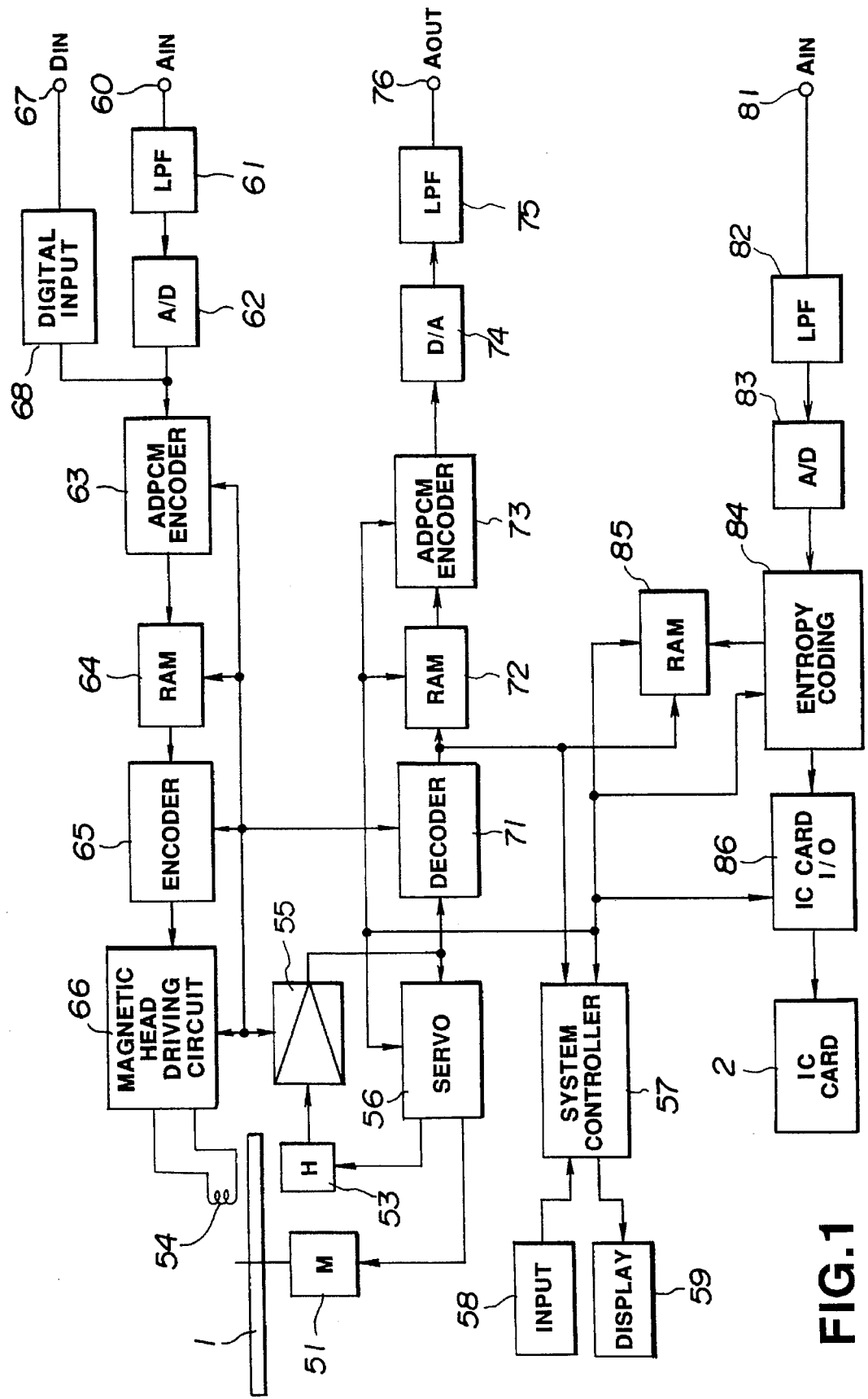
FIG. 1 is a block circuit diagram showing an arrangement of a disc recording/reproducing apparatus as an embodiment of the compressed data recording/reproducing apparatus according to the present invention.

First, FIG. 1 is a block circuit diagram showing a schematic arrangement of an embodiment of a compressed data recording and/or reproducing apparatus according to the present invention.

The recording/reproducing apparatus shown in FIG. 1 is constituted by a recording/reproducing unit for a magneto-optical disc 1 as one recording medium and a recording unit for an IC card 2 as another recording medium combined in one system. When a signal reproduced by a recording system on the side of the magnet-optical disc recording/reproducing unit is recorded by the IC card recording unit, the signal is read out from the magneto-optical disc 1 by an optical head 53, and is transmitted to a decoder 71, where the signal is processed with EFM demodulation, de-interleaving and error correction, so as to produce reproduced compressed data (ADPCM audio data). The ADPCM data is then transmitted to a memory 85 of the IC card recording unit, and is processed with variable bit rate coding by an entropy coding unit 84, so as to be recorded in the IC card via an IC card interfacing circuit 86. Thus, the reproduced compressed data is transmitted in a compressed state prior to being expanded by an ADPCM decoder 73, so as to be recorded in the IC card 2.

Meanwhile, in normal reproduction for audio listening, compressed data is read out from a recording medium (the recording medium 1) intermittently or in a burst-like manner by a predetermined data volume unit, e.g. 32 plus several sectors, and is expanded and converted into a continuous audio signal. In so-called dubbing, however, the compressed data in the medium is continuously read and transmitted to a recording system so as to be recorded. Thus, high-speed or short-time dubbing corresponding to the data compressibility can be carried out.

A concrete arrangement of FIG. 1 will now be described in detail.

In the magneto-optical disc recording/reproducing unit of the compressed data recording and/or reproducing apparatus shown in FIG. 1, the magneto-optical disc 1 which is rotated and driven by a spindle motor 51 is used as a recording medium. In recording data in the magneto-optical disc 1, the magneto-optical disc is irradiated with a laser light by the optical head 53, thereby to apply a modulated magnetic field corresponding to recording data by a magnetic head 54, thus carrying out so-called magnetic field modulation recording, and recording data along a recording track of the magneto-optical disc 1. In reproduction, the recording track of the magneto-optical disc 1 is traced with a laser light by the optical head 53, thus carrying out magneto-optical reproduction.

The recording/reproducing unit will be mainly described.

For example, the optical head 53 is constituted by a laser light source such as a laser diode, optical parts such as a collimator lens, an objective lens, a polarization splitter, a cylindrical lens, and a photodetector having a light receiving section of a predetermined pattern. The optical head 53 is provided in a position facing the magnetic head 54 with the magneto-optical disc 1 between them. When data is recorded in the magneto-optical disc 1, the magnetic head 54 is driven by a head driving circuit 66 of a recording system, as later described, so as to apply a modulated magnetic field corresponding to the recording data, and a target track on the magneto-optical disc 1 is irradiated with the laser light by the optical head 53, thus carrying out thermomagnetic recording by a magnetic field modulation method. The optical head 53 detects a reflected light of the laser light radiated on the target track, detecting, for example, a focal error by a so-called astigmatic method, and detecting a tracking error by a so-called push-pull method. When the data is reproduced from the magneto-optical disc 1, the optical head 53 detects the focal error and tracking error, and at the same time, detects a difference of an angle of polarization (Kerr angle of rotation) of the reflected light from the target track of the laser light, thus producing a reproduction signal.

An output of the optical head 53 is supplied to an RF circuit 55. The RF circuit 55 extracts the focal error and tracking error from the output of the optical head 53 and supplies them to a servo control circuit 56. At the same time, the RF circuit 55 converts the reproduction signal into a binary signal and supplies the binary signal to the decoder 71 of a reproducing system, as later described.

The servo control circuit 56 is constituted by, for example, a focal servo control circuit, a tracking servo control circuit, a spindle motor servo control circuit, a thread servo control circuit, and the like. The focal servo control circuit implements focal control of an optical system of the optical head 53 so that the focal error signal is zero. The tracking servo control circuit implements tracking control of the optical system of the optical head 53 so that the tracking error signal is zero. Further, the spindle motor servo control circuit controls the spindle motor 51 so as to rotate and drive the magneto-optical disc 1 at a predetermined rotational speed, e.g., at a constant linear velocity. The thread servo control circuit shifts the optical head 53 and the magnetic head 54 in a target track position on the magneto-optical disc 1 designated by a system controller 57. The servo control circuit 56, implementing the various kinds of control operations described above, transmits to the system controller 57 information indicating operational states of respective parts controlled by the servo control circuit 56.

A key input section 58 and a display section 59 are connected to the system controller 57. The system controller 57 controls the recording system and the reproducing system in an operational mode designated by input information through the key input section 58. The system controller 57 also controls the recording position and the reproducing position on the recording track traced by the optical head 53 and the magnetic head 54 on the basis of the sector-by-sector address information reproduced from the recording track of the magneto-optical disc 1 by a header time or sub-code Q data. The system controller 57 also causes the bit compression mode to be displayed on the display section 59, on the basis of the bit compression mode information in an ADPCM encoder 63 selectively switched by the key input section 58 and the bit compression mode information in the reproduced data produced from the RF circuit 55 by means of the reproducing system as later explained. At the same time, the system controller 57 causes the reproduction time to be displayed on the display section 59 on the basis of the data compressibility in the bit compression mode and the reproducing position information on the recording track.

For displaying the reproduction time, the sector-by-sector address information (absolute time information) reproduced from the recording track of the magneto-optical disc 1 by the so-called header time or so-called sub-code Q data is multiplied by a reciprocal of the data compression rate in the bit compression mode, for example, 4 for the data compression rate of ¼, to find the actual time information which is displayed on the display section 59. It is to be noted that if, also in recording, the absolute time information is recorded in advance (pre-formatted) on the recording track of the magneto-optical disc, the pre-formatted absolute time information may be read and multiplied by a reciprocal of the data compression rate, thus displaying the current position by the actual recording time.

In the recording system of the recording/reproducing unit of the disc recording/reproducing apparatus, an analog audio signal $A_{IN}$ from an input terminal 60 is supplied via a low-pass filter 61 to an A/D converter 62. The A/D converter 62 quantizes the analog audio input signal $A_{IN}$. The digital audio signal from the A/D converter 62 is supplied to the ADPCM encoder 63. A digital audio input signal $D_{IN}$ from an input terminal 67 is supplied via a digital input interfacing circuit 68 to the ADPCM encoder 63. The ADPCM encoder 63 processes the digital audio PCM data at a prescribed transfer rate, produced by quantizing the input signal $A_{IN}$ by the A/D converter 62, by subjecting it to bit compression (data compression) corresponding to the various modes of the above-mentioned CD-I format. The ADPCM encoder 63 has its operation mode designated by the system controller 57. It is assumed that, in a mode of level B, data is compressed data having the sampling frequency of 37.8 kHz and the number of bits per sample of 4, and is transmitted to a memory 64. The data transfer rate in a stereo mode of this level B is reduced to one-fourth the data transfer rate of 75 sectors/second according to the standard CD-DA format, that is, 18.75 sectors/second.

In the embodiment of FIG. 1, it is assumed that the sampling frequency of the A/D converter 62 is fixed at the sampling frequency of the standard CD-DA format, i.e., 44.1 kHz, and that, in the ADPCM encoder 63, after sampling rate conversion corresponding to the compression mode, for example from 44.1 kHz to 37.8 kHz in level B, is carried out, bit compression from 16 bits to 4 bits is carried out. Meanwhile, the sampling frequency itself of the A/D converter 62 may be switch-control led in accordance with the compression mode. In this case, a cut-off frequency of the low-pass filter 61 is switch-controlled in accordance with the sampling frequency of the switch-controlled A/D converter 12. That is, it suffices to simultaneously switch-control the sampling frequency of the A/D converter 62 and the cut-off frequency of the low-pass filter 61 in accordance with the compression mode.

The memory 64 has data writing and readout controlled by the system control let 57, and is used as a buffer memory for temporarily storing therein ADPCM data supplied from the ADPCM encoder 63 and for recording on the disc when necessary. That is, the compressed audio data supplied from the ADPCM encoder 63 in the stereo mode of the above-mentioned level B has its data transfer rate reduced to one fourth the data transfer rate of 75 sectors/second of the standard CD-DA format, i.e., 18.75 sectors/second. These compressed data are continuously written in the memory 64. Although it suffices to record the compressed data (ADPCM data) at the rate of one of four sectors in the above-mentioned manner, the data are recorded in a sector-continuous manner, as later explained, because of virtual infeasibility of such recording at an interval of four sectors.

The recording is performed, after a non-recording period, in a burst-like manner at the same data transfer rate of 75 sectors/second as that for the standard CD-DA format, with a cluster composed of a predetermined number of sectors, such as 32 plus several sectors, as a recording unit. That is, the ADPCM audio data of the stereo mode and of level B, written continuously at a lower transfer rate of 18.75 (=75/4) sectors/second corresponding to the above-mentioned bit compression rate, are read out from the memory 64 as recording data in a burst-like manner at the above-mentioned transfer rate of 75 sectors/second. The overall data transfer rate for the read-out and recorded data, including that of the non-recording period, is the above-mentioned low rate of 18.75 sectors/second. However, the instantaneous data transfer rate within the time interval of the burst-like recording operation is the above-mentioned standard rate of 75 sectors/second. In this manner, if the rotational speed of the disc is the same speed as that of the standard CD-DA format, that is, the constant linear velocity, recording is performed with the same recording density and the same memory pattern as those of the CD-DA format.

The ADPCM audio data read out in a burst-like manner from the memory 64 at the above-mentioned instantaneous transfer rate of 75 sectors/second, i.e. recording data, are supplied to an encoder 65. It is to be noted that, in a data array supplied from the memory 64 to the encoder 65, one continuous recording unit is made up of a cluster consisting of a plurality of, e.g. 32 sectors, and several cluster-linking sectors arrayed before and after the cluster. These cluster-linking sectors are set to be longer than the interleaving length in the encoder 65 so that data of adjoining clusters remain unaffected by interleaving.

The encoder 65 processes the recording data supplied from the memory 64 in a burst-like manner by subjecting it to encoding for error correction, such as parity appending and interleaving, and EFM encoding. The encoded recording data from the encoder 65 are supplied to the magnetic head driving circuit 66. The magnetic head driving circuit 66 is connected to the magnetic head 54 for driving the magnetic head 54 so as to apply a magnetic field modulated in accordance with the recording data on the magneto-optical disc 1.

The system controller 57 carried out memory control for the memory 64 in the above-mentioned manner, and controls the recording position so that the recording data read out in a burst-like manner by the memory control from the memory 64 are continuously recorded in the recording track of the magneto-optical disc 1. The recording position on the recording track is controlled so that the recording position of the recording data read out in a burst-like manner from the memory 64 is controlled by the system controller 57, thus supplying to the servo control circuit 56 a control signal designating the recording position on the recording track of the magneto-optical disc 1.

The reproducing system of the magneto-optical disc recording/reproducing unit will now be described.

The reproducing system is used for reproducing the data continuously recorded on the recording track of the magneto-optical disc 1 by the above-mentioned recording system, and is provided with the decoder 71. The decoder 71 is supplied with a reproduction output which is produced by tracing the recording track of the magneto-optical disc 1 by the laser light from the optical head 53 and which is converted into corresponding binary signals by the RF circuit 55.

The decoder 71 is a counterpart of the encoder 65 of the above-mentioned recording system, and processes the binary reproduction output from the RF circuit 55 by the above-mentioned decoding and EFM decoding for error correction, thus reproducing the ADPCM audio data of the stereo mode, level B, at the transfer rate of 75 sectors/second which is higher than the regular transfer rate in the stereo mode at level B. The reproduction data obtained by the decoder 71 is supplied to a memory 72.

The memory 72 has data writing and readout controlled by the system controller 57, and has the reproduced data supplied from the decoder 71 at the transfer rate of 75 sectors/second is written therein in a burst-like manner at the transfer rate of 75 sectors/second. The reproduction data written in a burst-like manner in the memory 72 at the above-mentioned transfer rate of 75 sectors/second are continuously read out at the regular transfer rate of 18.75 sectors/second of the stereo mode, level B.

The system controller 57 implements such memory control as to write the reproduction data in the memory 72 at the transfer rate of 75 sectors/second and to continuously read out the reproduced data from the memory 72 at the transfer rate of 18.75 sectors/second. The system controller 57 implements the memory control for the memory 72, and also controls the reproducing position so that the reproduction data written in a burst-like manner from the memory 72 are continuously reproduced from the recording track of the magneto-optical disc 1. The reproducing position is so controlled that the reproducing position of the reproduction data read out in a burst-like manner from the memory 72 is controlled by the system controller 57 and that a control signal designating the reproducing position on the recording track of the magneto-optical disc 1 is supplied to the servo control circuit 56.

The ADPCM audio data of level B, stereo mode, as the reproduction data read out continuously from the memory 72 at the transfer rate of 18.75 sectors/second, is supplied to the ADPCM decoder 73. The ATC decoder 73 is a counterpart of the ADPCM encoder 63 of the recording system, and has its operation mode designated by the system controller 57. The ADPCM decoder 73 reproduces 16-bit digital audio data by four-fold data expansion (bit expansion) of the ADPCM data of the stereo mode, level B. The digital audio data from the ATC decoder 73 is supplied to a D/A converter 74.

The D/A converter 74 converts the digital audio data from the ADPCM decoder 73 into analog signals, thus forming analog audio output signals $A_{OUT}$. The analog audio signals $A_{OUT}$ from the D/A converter 74 are outputted via a low-pass filter 75 from an output terminal 76.

Then, the IC card recording unit of the compressed data recording and/or reproducing apparatus will be described.

Analog audio input signals $A_{IN}$ from an input terminal 81 are supplied via a low-pass filter 82 to an A/D converter 83, where the analog audio input signals $A_{IN}$ are quantized. The digital audio signals obtained from the A/D converter 83 are transmitted to the so-called entropy coding unit 84, so as to be entropy-encoded. This processing is carried out, accompanying data readout from and data writing in the memory 85. The data encoded by variable bit rate compression encoding from the entropy coding unit 84 is recorded in the IC card 2 via an IC card interfacing circuit 86. It is a matter of course that, in the present invention, fixed bit rate recording may be carried out instead of using the entropy coding unit or the like.

Meanwhile, the compressed data (ADPCM data) from the decoder 71 of the reproducing system of the magneto-optical disc recording/reproducing unit is supplied directly, without expansion, to the memory 85 of the IC card recording unit. This data transfer is carried out by the system controller 57 controlling the memory 85 etc. during so-called high-speed dubbing. Also, the compressed data from the memory 72 may be transmitted to the memory 85.

The so-called high-speed digital dubbing will now be described.

During the so-called high-speed dubbing, the system controller 57 implements a predetermined high-speed dubbing controlling operation on actuating a dubbing key etc. of the key input section 58. Specifically, the compressed data from the decoder 71 is directly supplied to the memory 85 of the IC card recording system and is processed with variable bit rate encoding by the entropy coding unit 84, so as to be recorded on the IC card 2 via the IC card interfacing circuit 86. If the ADPCM data of the stereo mode, level B, is recorded in the magneto-optical disc 1, a four-fold volume of the compressed data is continuously read out from the decoder 71.

Thus, during the high-speed dubbing, compressed data corresponding to the four-fold time duration on the real-time basis (in the case of the stereo mode, level B) is continuously produced from the magneto-optical disc 1, and is entropy-coded and recorded in the IC card 2, thus realizing high-speed dubbing at a speed four times higher. The magnification of the dubbing speed is varied with different compression modes. Dubbing may also be performed at a speed equal to and higher than the magnification of compression. In such case, the magneto-optical disc 1 is rotationally driven at a speed several times the stationary speed.

Figure 2:
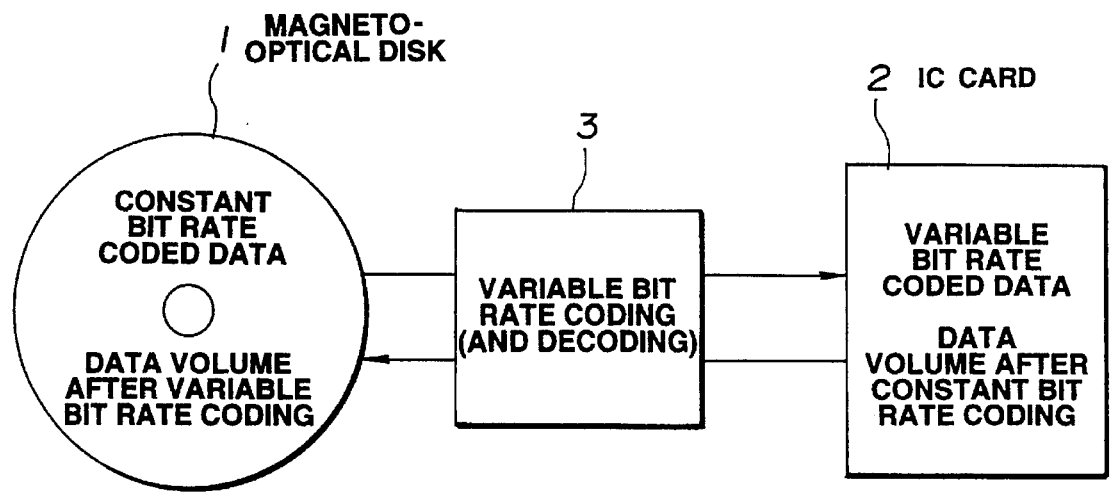
FIG. 2 is a view showing recorded contents of a magneto-optical disc 1 and an IC card 2.

Referring to FIG. 2, the data encoded with bit compression coding at a constant bit rate, and the information of the data volume at the time when the data are encoded with bit compression coding in a variable bit rate coding unit 3, that is, the data recording capacity required for recording in the IC card 2, are recorded in the magneto-optical disc 1. In this manner, the number of airs being able to be recorded in the IC card 2 and the combination of these airs, among those recorded in the magneto-optical disc 1, can be instantly known by reading out the data volume information.

Conversely, if not only the data encoded by bit compression coding at the variable bit rate but also the information of the volume of data encoded with bit compression at a constant bit rate are recorded in the IC card 2, the volume of data in transmitting and recording data such as airs from the IC card 2 to the magneto-optical disc 1 can be known promptly.

Figure 3:
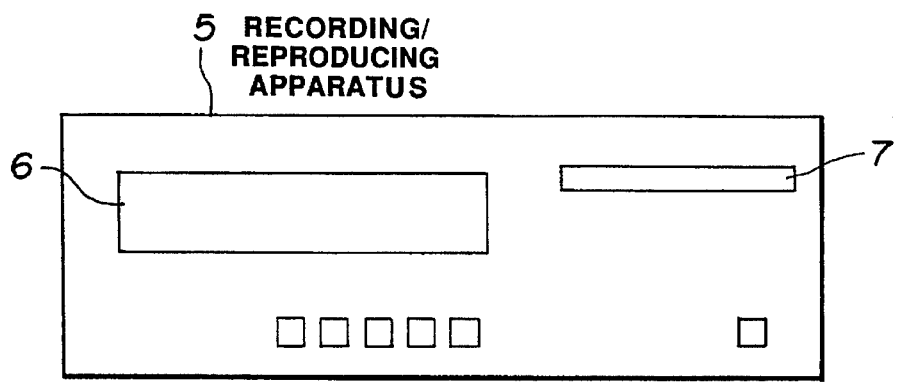
FIG. 3 is a schematic front view showing an example of appearance of the embodiment apparatus.

FIG. 3 is a front view showing appearance of a compressed data recording and/or reproducing apparatus 5, of the arrangement shown in FIG. 1. The compressed data recording and/or reproducing apparatus 5 is provided with a magneto-optical disc inserting section 6 and an IC card inserting slot 7.

A technique of data volume reduction by means of deleting processing block data of bit compression at the time of reproducing/recording bit-compressed data between the magneto-optical disc 1 and the IC card 2 will now be described. In the ADPCM as high efficiency coding prescribed in the CD-I format, block floating is carried out for every 28 words. That is, a maximum absolute value is found for every 28 words, and a sample value in the block becomes two-fold for the number of times within a range of the maximum absolute value not exceeding an expressive maximum value of coding (for example, $2^{15}-1$ in the case of 16-bit expression). Thus, the dynamic range of the signal can be expressed to be large, and the above-mentioned number of times is called a scale factor. The scale factor indicates which number the sample value is to be divided by for normalization, and is an index indicating the size of the signal. When this scale factor is above a certain value, that is, when the signal is small, samples in the bit-compressed block are not recorded in the above-mentioned other recording medium such as the IC card 2, so as to delete a silent portion in a sound, thus extending the recording time.

Referring to FIG. 4, each of the bit compression processing blocks on the time axis is constituted by 28 words, having one scale factor. For example, a scale factor of the CD-I format is found in the following manner. The maximum value of absolute values of the respective 28 words in the block is found, and the found maximum value is multiplied by $2^N$, so that the maximum N not exceeding a maximum value determined by the number of bits of the word (that is, the expressive maximum value of coding, e.g. $2^{15}-1$ in the 16-bit expression) is found as the scale factor. FIG. 4A shows the scale factor of each block, and FIG. 4B shows temporal changes of the signal.

Referring to blocks $B_1, B_2, \ldots, B_9$ in FIG. 4A, since the scale factors of blocks $B_3, B_4, B_5, B_9$ are greater than a certain threshold $S_{TH}$, it is indicated that these blocks are time domains corresponding to silent portions having small signals as shown in FIG. 4B.

It is known that a silent zone constitutes about 40% of a normal sound signal waveform. Therefore, it is possible to extend the recording time for approximately 40% on average by deleting the silent zone. If the number of bit compression processing blocks deleted in this process is recorded, it is possible to re-insert the silent portion at the time of reproduction. In order to achieve this, the following operation is needed.

Figure 5:
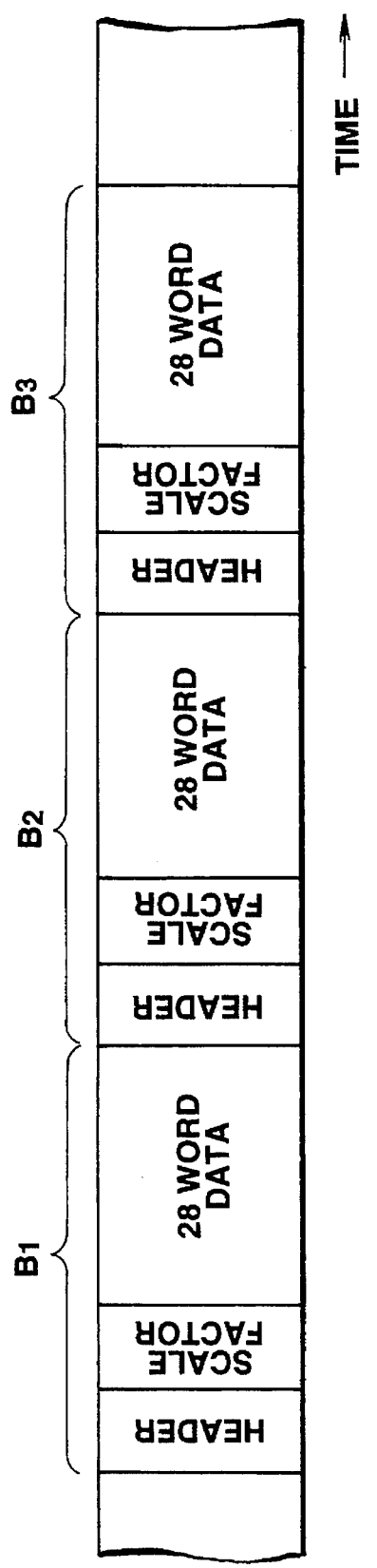
FIG. 5 is a view showing data structure of bit compression of CD-I format.
Figure 6:
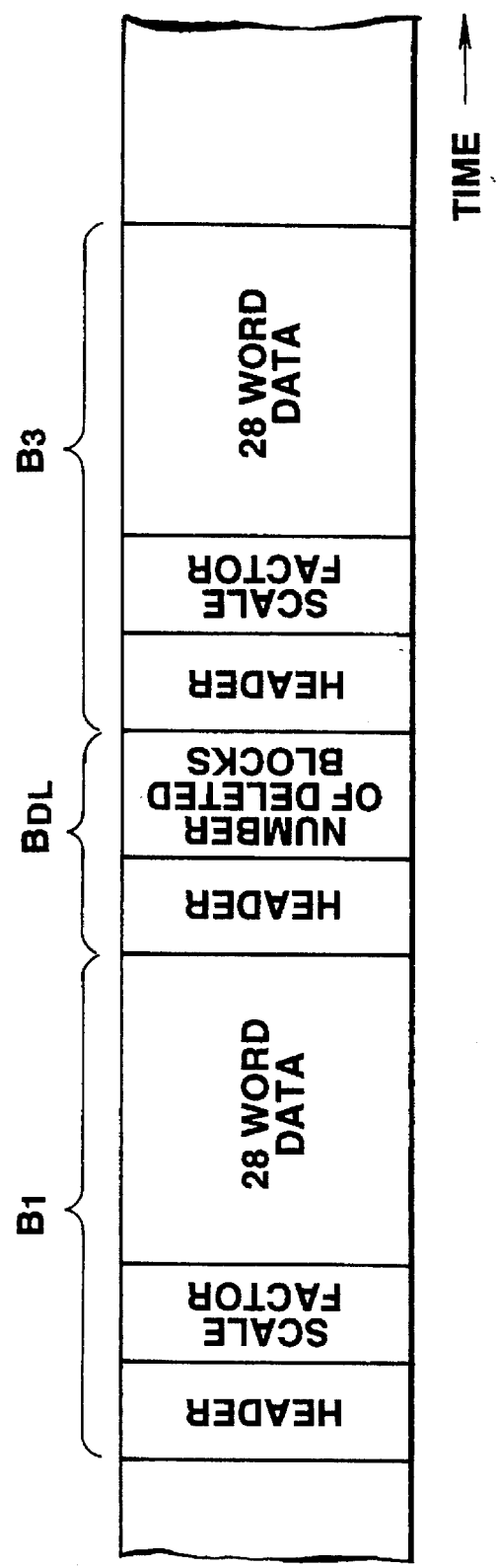
FIG. 6 is a view showing data structure at the time when blocks have been deleted.

The bit-compressed data has a structure in which each bit compression processing block is present between header data sections. Thus, when, for example, a bit compression processing block $B_2$ shown in FIG. 5, having a small scale factor, that is, small signal amplitude, is to be deleted, a particular block $B_{DL}$ indicating the number of the deleted blocks is inserted instead of the deleted bit compression processing block, as shown in FIG. 6.

In the decoder, the absence of 28 words of this deleted block is detected, and the presence of the block $B_{DL}$ indicating the number of the deleted blocks instead of the deleted block can be recognized. Thus, silent portions corresponding to number of the deleted blocks or an arbitrary silent time block can be inserted. A constant length of this arbitrary silent time is effective for stable listening.

When the scale factors of bit compression are above the threshold $S_{TH}$ across at least 3 consecutive processing blocks on the time axis, it is preferable to delete processing block(s) except those on both ends, among the consecutive processing blocks, for recording.

Meanwhile, in the above description, the ADPCM prescribed in the so-called CD-I OF CD-ROM XA audio data format is mentioned for bit compression coding at a constant bit rate. However, the following high efficiency compression coding is also considered. That is, the technique of high efficiency coding of input digital signals, such as audio PCM signals, using the techniques of sub-band coding (SBC), adaptive transform coding (ATC) and adaptive bit allocation (APC-AB), will now be explained with reference to FIG. 7 and the subsequent drawings.

Figure 7:
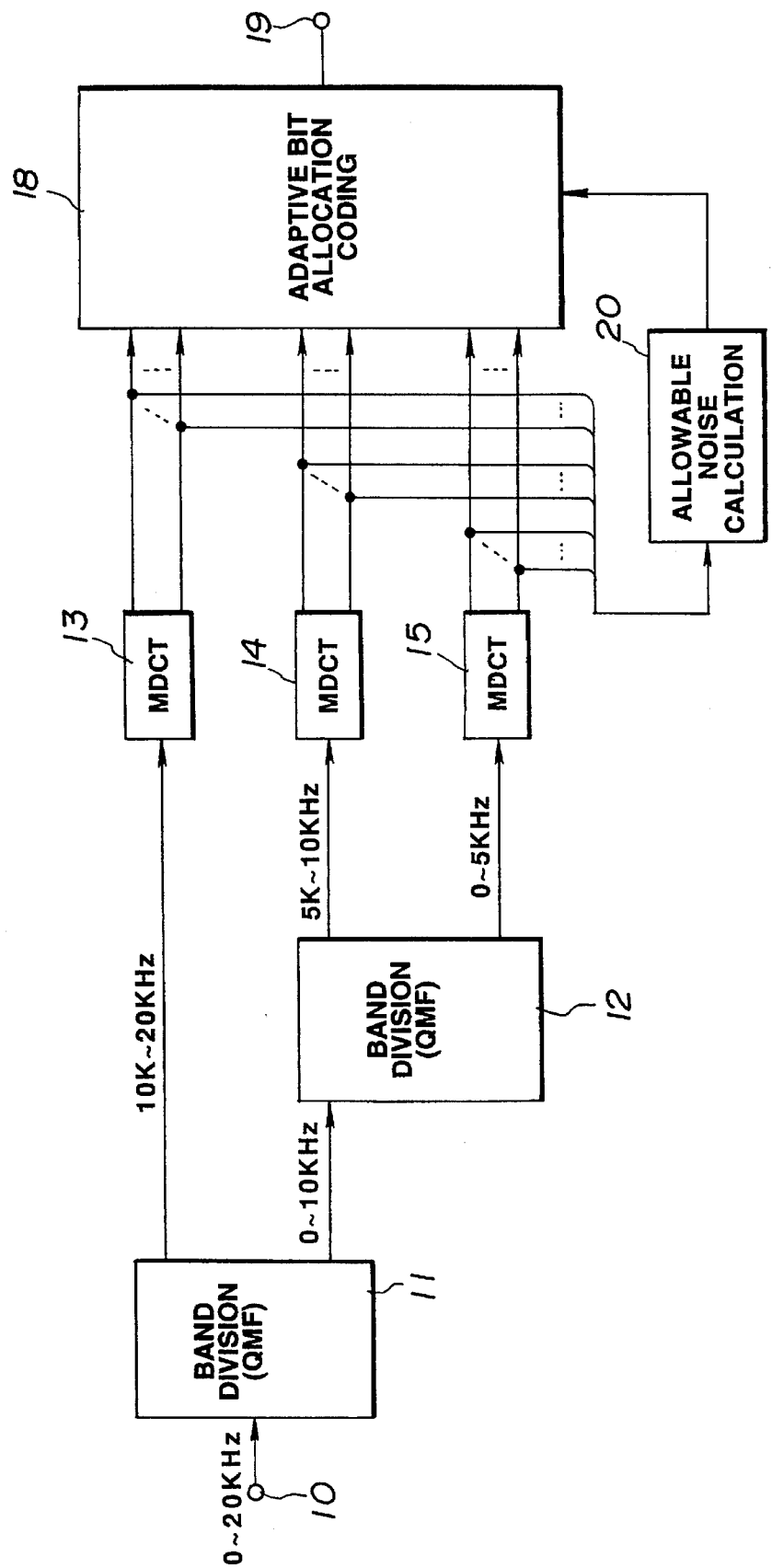
FIG. 7 is a block circuit diagram showing a concrete example of a high efficiency compression coding apparatus usable for constant, bit rate compression coding of the embodiment.

In a high efficiency encoding apparatus, concretely shown in FIG. 7, input digital signals are divided in frequency into plural frequency bands, with the bandwidths being broader in the direction of the increasing frequency. Orthogonal transform is carried out for each frequency band, and resulting spectrum data along the frequency axis are encoded by adaptive bit allocation for each of so-called critical bands in consideration of human auditory characteristics, as later explained, on the low frequency range side, and for each of sub-divided bands produced by dividing the critical band in consideration of so-called block floating efficiency, on the mid-high frequency range side. Further, in the present embodiment of the invention, the block size or block length is adaptively changed in accordance with the input signal prior to the orthogonal transform, and floating processing is carried out for each of the blocks.

That is, in FIG. 7, audio PCM signals in the range of the frequency of 0 to 20 kHz are supplied to an input terminal 10. These input signals are divided in frequency by a frequency dividing filter 11, such as a so-called QMF filter, into a band of 0 to 10 kHz and a band of 10 kHz to 20 kHz, while the signals in the range of 0 to 10 kHz are divided by a frequency dividing filter 12, such as the so-called QMF filter, into a band of 0 to 5 kHz and a band of 5 kHz to 10 kHz. The signals in the range of from 10 kHz to 20 kHz from the filter 11 are transmitted to a modified discrete cosine transform (MDCT) circuit 13, which is an example of the orthogonal transform circuit, while the signals in the range of from 5 kHz to 10 kHz from the frequency dividing filter 12 are supplied to an MDCT circuit 14 and the signals in the range of from 0 to 5 kHz from the frequency dividing filter 12 are supplied to an MDCT circuit 15, thus implementing MDCT processing, respectively.

FIG. 8 shows concrete examples of the blocks of the respective bands supplied to the MDCT circuits 13 to 15 for standard input signals.

Figure 8A:
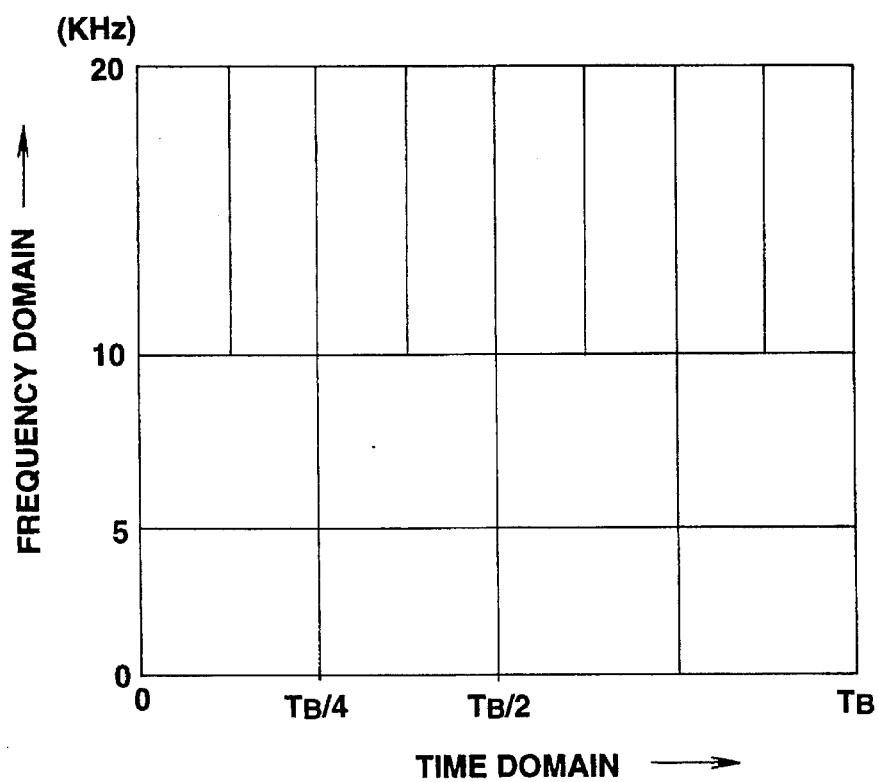
FIGS. 8A and 8B is a view showing a concrete example of blocking along the time axis in a division band and respective bands in the apparatus shown in FIG. 7.

In the concrete examples, shown in FIG. 8, three filter output signals have two plural orthogonal transform block sizes separately for the respective bands, and have time resolution thereof switched by temporal characteristics of the signals. That is, when the signal is temporally quasi-stationary, the orthogonal block size is regarded as being large, as shown in Fog.8B. When the signal is non-stationary, the orthogonal transform block size is regarded as being small, as shown in FIG. 8A.

Figure 8B:
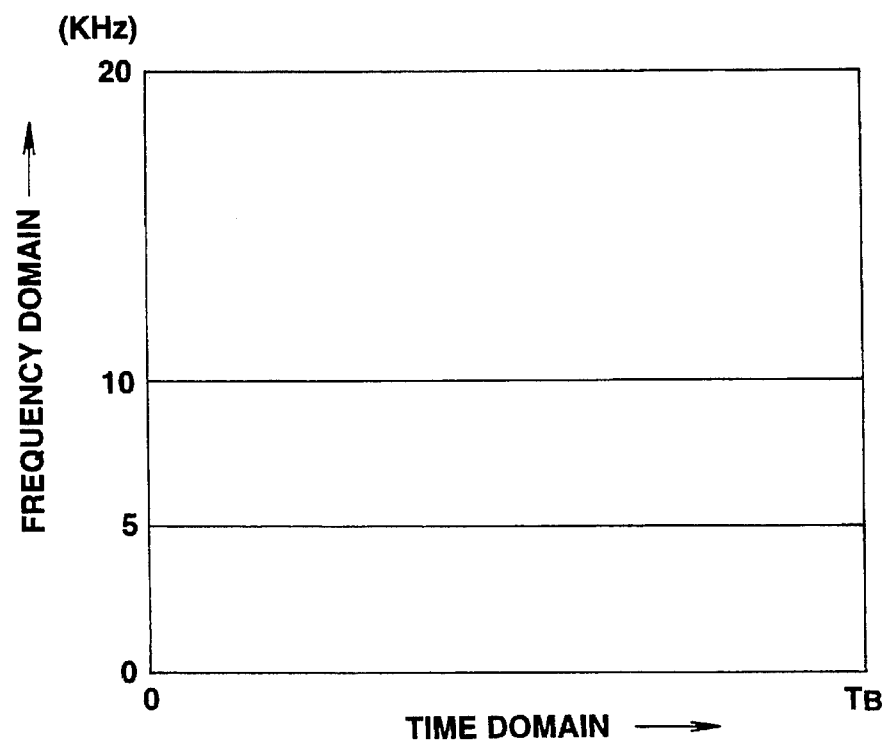

That is, when the three output filters are quasi-stationary, each of the bands 0 to 5 kHz, 5 kHz to 10 kHz, and 10 kHz to 20 kHz, has the orthogonal transform block size $T_B$, as shown in FIG. 8B. On the other hand, when there is a band decided to be non-stationary, the bands 0 to 5 kHz and 5 kHz to 10 kHz have the orthogonal transform block size $T_B/4$, respectively, and the band 10 kHz to 20 kHz has the orthogonal transform block size $T_B/8$. Meanwhile, when the band of a frequency range of 0 to 22 kHz is considered as an input signal, low, mid, and high frequency ranges are 0 to 5.5 kHz, 5.5 kHz to 11 k Hz, and 11 kHz to 22 kHz, respectively.

Returning to FIG. 7, spectrum data on the frequency axis or MDCT coefficient data, produced through MDCT processing by the MDCT circuits 13 to 15, are grouped together in so-called critical bands on the low frequency range side, and have the critical bandwidth further divided in consideration of effectiveness of block floating on the mid and high frequency range sides, thus to be supplied to an adaptive bit allocation coding circuit 18. The critical bands means the frequency ranges which are divided in consideration of human auditory sense, and each of them denotes a band of a narrow-band noise which has the strength equal to that of a pure sound having the frequency in the vicinity of that of the noise and is capable of masking the pure sound. Each critical band has a bandwidth which becomes broader in the direction of the increasing frequency. The entire frequency range of 0 to 22 kHz is divided into e.g. 25 critical bands.

An allowable noise calculation circuit 20 finds the allowable noise quantity for each divided band taking account of so-called masking effect, on the basis of the spectrum data divided for each critical band. The allowable noise calculation circuit 20 then finds the number of allocated bits for each critical band on basis of the allowable noise quantity and the energy or peak value for each critical band, thus re-quantizing each of the spectrum data or MDCT coefficient data tin accordance with the number of bits allocated for each critical band by the adaptive bit allocation coding circuit 18. The data encoded in this manner are taken out through an output terminal 19.

Figure 9:
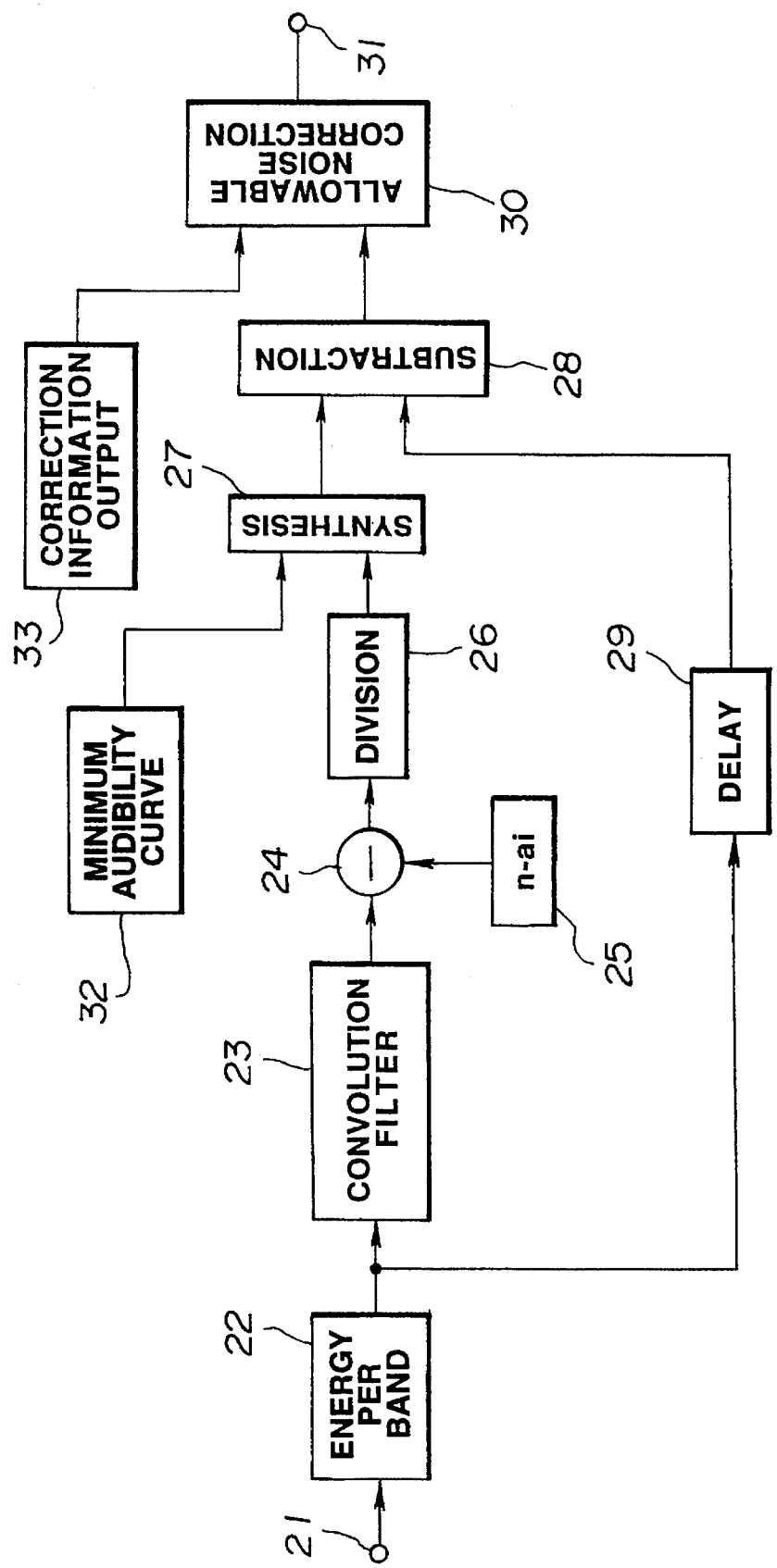
FIG. 9 is a block circuit diagram showing a concrete example of an allowable noise calculation circuit of the apparatus shown in FIG. 7.
Figure 10:
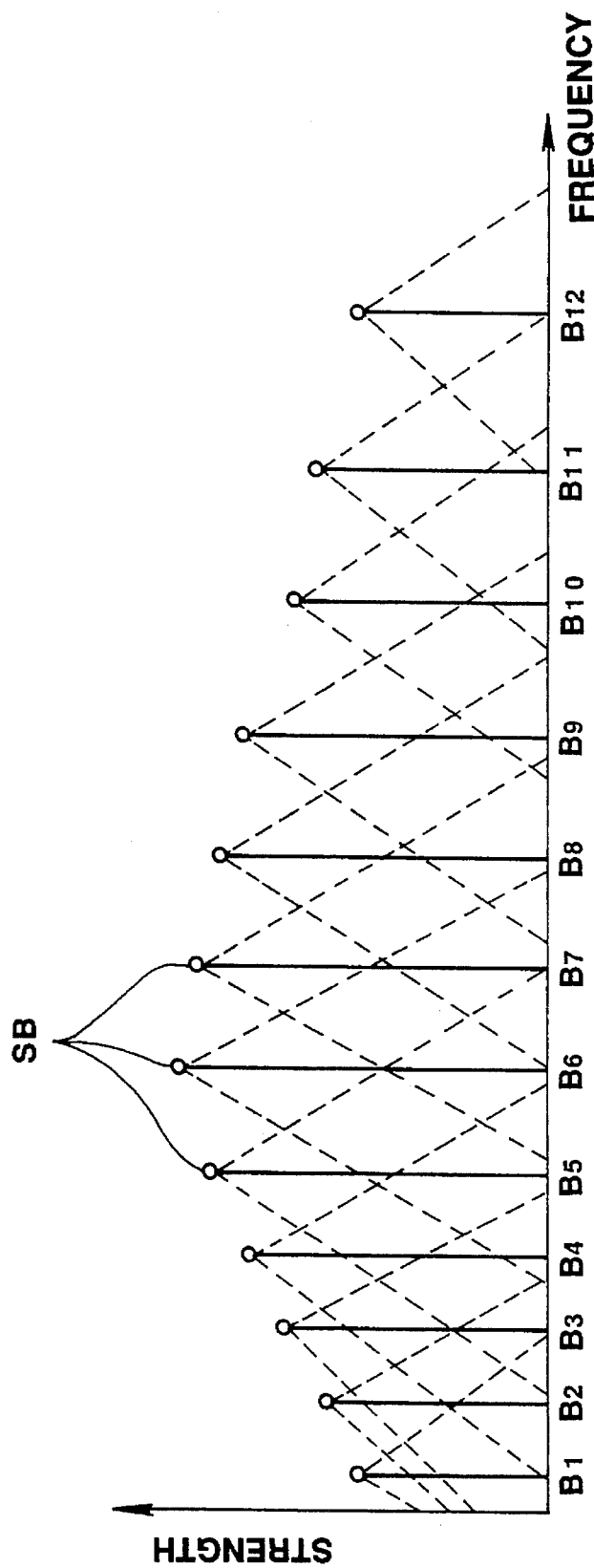
FIG. 10 is a view showing a Burke spectrum.

FIG. 9 shows, in a block circuit diagram, a schematic arrangement of a concrete example of the allowable noise calculation circuit 20. In FIG. 9, the spectrum data on the frequency axis are supplied from the MDCT circuits 13 to 15 to an input terminal 21.

The input data on the frequency axis are supplied to an energy calculation circuit 22 for each band, in which the energy for each of the critical bands is found by calculating the sum of amplitudes in the band. The peak and mean values of the amplitudes may also be used instead of the energies of the respective bands. The spectrum of the sum of the respective bands, as an output from the energy calculation circuit 22, is generally called Burke spectrum. The Burke spectrum for each critical band is indicated by SB in FIG. 9. However, the number of the critical bands is expressed by 12 (for $B_1$ to $B_{12}$) in FIG. 9, for simplifying the drawing.

For taking account of the effects of the Burke spectrum SB on masking, a convolution operation is carried out, in which the spectra SB are multiplied by predetermined weighting coefficients and the resulting products are summed together. Therefore, the outputs of the band energy calculation circuit 22, that is, the values of the spectra SB, are supplied to a convolution filter circuit 23. The convolution filter circuit 23 is composed of plural delay elements for sequentially delaying input data, plural multipliers, for example, 25 multipliers corresponding to the respective bands, for multiplying the outputs of these delay elements by filter coefficients, that is, the weighting functions, and an adder for calculating the sum of the respective multiplier outputs. By this convolution operation, the sum of the portions indicated by broken lines in FIG. 9 is calculated. Meanwhile, the masking means a phenomenon in which a signal becomes inaudible to the human ears by being masked by another signal. Such masking effects may be classified into time axis masking effects due to audio signals on the time axis and concurrent masking effects due to signals on the frequency axis. By means of these masking effects, any noise that may be present in the masked portion becomes inaudible. For this reason, the noise in the masked region is allowable in actual audio signals.

In a concrete example of the multiplication coefficients (filter coefficients) of the respective multipliers of the convolution filter circuit 23, if the coefficient of a multiplier M for an arbitrary band is 1, outputs of the respective delay elements are multiplied by coefficients 0.15, 0.0019, 0.0000086, 0.4, 0.06 and 0.007 by multipliers M–1, M–2, M–3, M+1, M+2 and M+3, respectively, thus implementing the convolution operations on the Burke spectrum SB. Meanwhile, M is an arbitrary integer of from 1 to 25.

The output of the convolution filter circuit 23 is supplied to a subtractor 24. The subtractor 24 is adopted for finding a level a corresponding to an allowable noise level, as later described, in the convolved region. The level a corresponding to the allowable noise level is such a level as to be an allowable noise level for each critical band by implementing inverse convolution as later described. A permissible function (function representing the masking level) for finding the level a is supplied to the subtractor 24. The level a is controlled by increasing or decreasing the permissible function. The permissible function is supplied from an (n–ai) function generating circuit 25 now to be described.

If the number given to the critical bands from the low frequency range toward the high frequency range is i, the level a corresponding to the allowable noise level is found from the following formula (1):

$$a=S-(n-ai) \qquad (1)$$

where n and a are constants, with a >0, and S is strength of the convolved Burke spectrum, with (n–ai) in the above formula being the permissible function. In the present embodiment, n=38 and a=1, in which optimum encoding may be achieved without deterioration in sound quality.

The level a is found in this manner, and the corresponding data are transmitted to a divider 26. The divider 26 is adopted for inversely convolving the level a in the convolved region. Thus, through the inverse convolution, the masking spectrum may be found from the level a. That is, the masking spectrum becomes the allowable noise spectrum. Although the inverse convolution needs complex operation, it is carried out by the simplified divider 26 in the present embodiment.

The masking spectrum is transmitted via a synthesis circuit 27 to a subtractor 28. The subtractor 28 is supplied with an output of the band energy calculation circuit 22, that is, the spectrum SB, via a delay circuit 29. Through the subtraction between the masking spectrum and the Burke spectrum SB by the subtractor 28, the part of the Burke spectrum SB below the level indicated by the masking spectrum MS is to be masked, as shown in FIG. 8.

The output of the subtractor 28 is taken out from an output terminal 31 via an allowable noise correction circuit 30, and is transmitted to a ROM, not shown, in which information of the number of allocated bits is stored. This ROM outputs the information of the number of bits allocated to each band, in accordance with the output from the subtractor 28 via the allowable noise correction circuit 30, that is, the level difference between the band energies and the outputs of the noise level setting means. The information of the number of the allocated bits is supplied to the adaptive bit allocation coding circuit 18, so that the spectrum data on the frequency axis from the MDCT circuits 13, 14 and 15 are quantized with the number of bits allocated to each of the bands.

In sum, the adaptive bit allocation coding circuit 18 quantizes the spectrum data for each of the bands with the number of bits allocated in accordance with the level of the differences between the energies of the respective critical bands and the outputs of the noise level setting means. It is to be noted that the delay circuit 29 is provided for delaying the Burke spectrum SB from the energy calculation circuit 22 in consideration of the delay caused in the circuits prior to the synthesis circuit 27.

Figure 11:
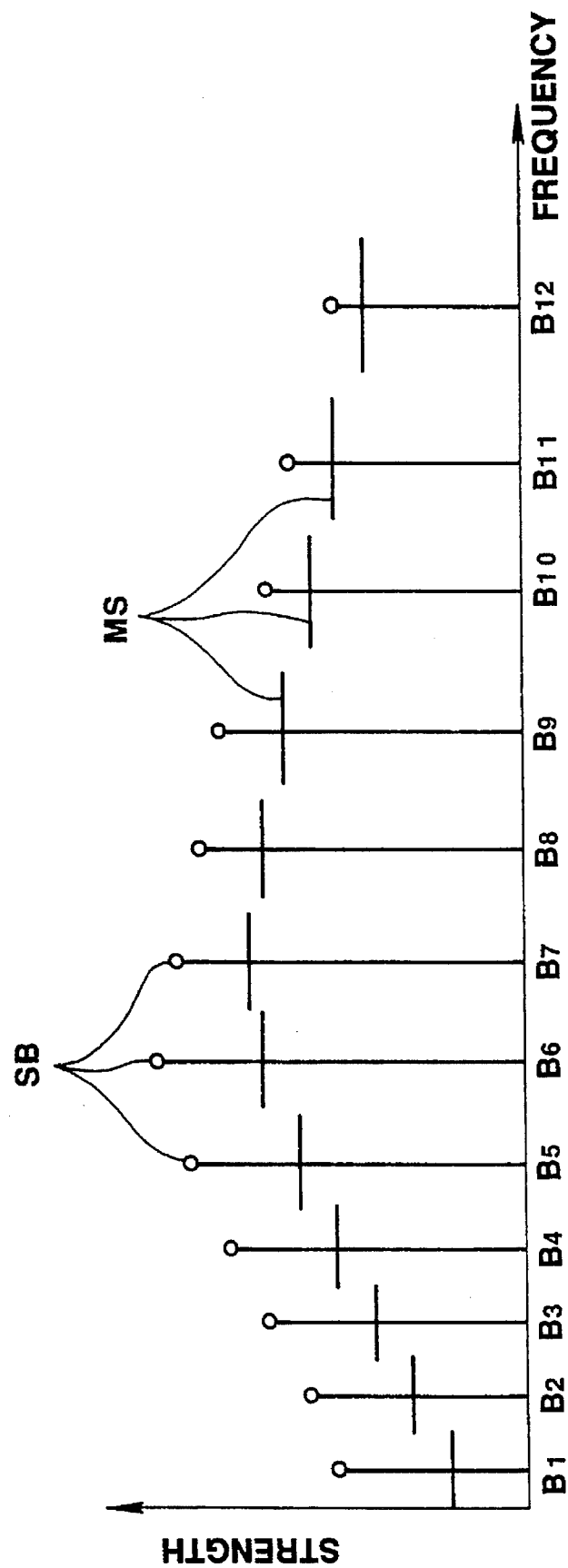
FIG. 11 is a view showing a masking spectrum.
Figure 12:
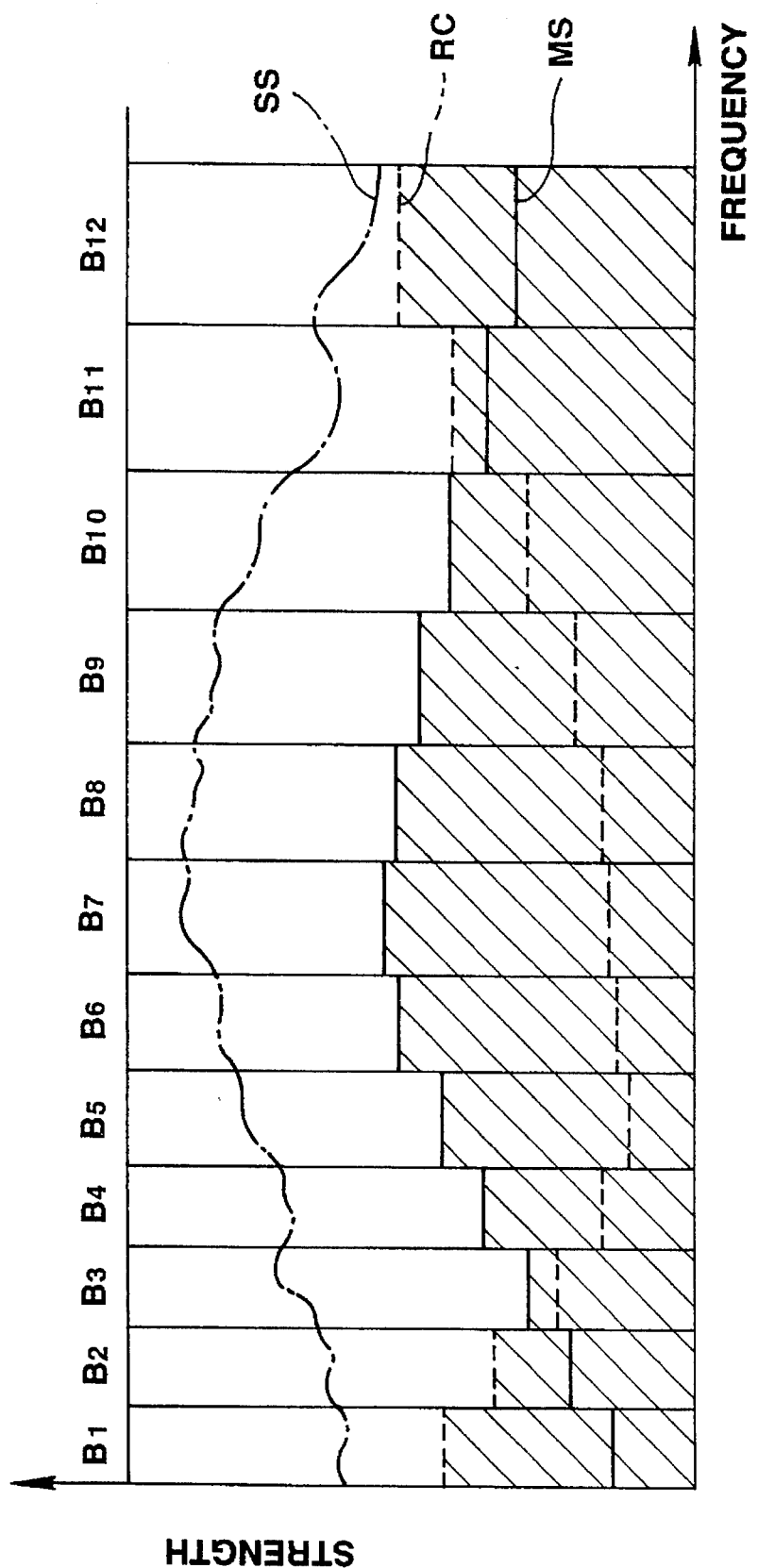
FIG. 12 is a view in which a minimum audibility curve and the masking spectrum are synthesized.

In the synthesis by the synthesis circuit 27, data indicating a so-called minimum audibility curve RC from a minimum audibility curve generating circuit 32, the curve exhibiting characteristics of the human auditory sense as shown in FIG. 11, can be combined with the above-mentioned masking spectrum MS. In the minimum audibility curve, a noise is inaudible if its absolute level is not higher than the minimum audibility curve. The minimum audibility curve becomes different with e.g. difference in the playback volume, even with the same coding. However, in an actual digital system, there is no significant difference in the manner of entrance of the music of, for example, a 16-bit dynamic range. Therefore, if the quantization noise in the frequency range near 4 kHz, which is most audible to human ears, becomes inaudible, the quantization noise not higher than the level of the minimum audibility curve is thought to be inaudible in other frequency ranges. Accordingly, on the assumption that the system is used in such a manner that the noise near 4 kHz of the word length of the system is inaudible, if the allowable noise level is to be obtained by synthesizing the minimum audibility curve RC and the masking spectrum MS, the allowable noise level can reach up to the portion indicated by slant lines in FIG. 11. Meanwhile, in the present embodiment, the level of 4 kHz of the minimum inaudibility curve is matched with the minimum level corresponding to e.g. 20 bits. Also, a signal spectrum SS shown in FIG. 11.

The allowable noise correction circuit 30 corrects the allowable noise level in an output of the subtractor 28 on the basis of e.g. the information of an equal loudness curve which is transmitted thereto from a correction information outputting circuit 33. The equal loudness curve is related to certain characteristics of the human auditory sense, and is found by connecting, into a curve, the pressures of sounds at the respective frequencies which are heard at the same magnitude as the pure sound of 1 kHz. The equal loudness curve is also called an equal sensitivity curve of loudness. The equal loudness curve delineates substantially the same curve as that of the minimum audibility curve shown in FIG. 11. In the equal loudness curve, a sound with a sound pressure lower by 8 to 10 dB than the sound pressure at 1 kHz is heard at the same magnitude as a 1 kHz sound, in the vicinity of 4 kHz, whereas a sound cannot be heard in the vicinity of 50 kHz unless the sound pressure is higher by about 15 dB than the sound pressure at 1 kHz. For this reason, it is preferable to cause the noise (allowable noise level) exceeding the level of the minimum audibility curve to have frequency characteristics given by the curve corresponding to the equal loudness curve. Thus, it will be appreciated that correction of the allowable noise level taking account of the equal loudness curve is suitable for the characteristics of the human auditory sense.

The correction information outputting circuit 33 may also be designed for correcting the allowable noise level on the basis of information of errors between the detected output of the output information volume (data volume) in quantization by the coding circuit 18 and the target bit rate for the ultimate encoded data. That is, the total number of bits produced by implementing in advance transient adaptive bit allocation to the totality of the bit allocation unit blocks may have an error for a constant number of bits (target value) determined by the bit rate of the ultimate encoded output data, so that bit re-allocation is carried out for reducing the error to zero. Specifically, if the total number of allocated bits is smaller than the target value, the number of bits corresponding to the difference is distributed to the unit blocks for bit appending. On the other hand, if the total number of bits is larger than the target value, the number of bits corresponding to the difference is distributed to the unit blocks for bit reduction.

To this end, an error of the total number of allocated bits for the target value is detected, and the correction information outputting circuit 33 outputs correction data for correcting the number of the allocated bits on the basis of the error data. If the error data indicates bit shortage, more bits are used per unit block, so that the data volume is larger than the above-mentioned target value. If the data volume indicates data excess, a smaller number of bits suffice per unit block, and therefore the data volume is smaller than the target value. Thus, the correction information outputting circuit 33 outputs the correction data for correcting, in accordance with the error data, the allowable noise level in the output of the subtractor 28 on the basis of information data of the equal loudness curve. These correction data are transmitted to the allowable noise correction circuit 30, so that the allowable noise level from the subtractor 28 is corrected.

It is to be noted that the present invention is not limited to the embodiment described above. For example, the one recording/reproduction medium and the other recording/reproduction medium need not be integrated but can be connected by means of a data transmission cable. In addition, the present invention can be applied to the signal processing apparatus not only for audio PCM signals but also for digital speech signals and digital video signals. Also, the present invention may have an arrangement in which the synthesis processing of the minimum audibility curves is not carried out in this case, the minimum audibility curve generating circuit 32 and the synthesis circuit 27 are not necessary, and the output from the subtractor 24 is inversely convolved by the divider 26 and is then promptly transmitted to the subtractor 28. Further, dubbing at a higher speed than the bit compression rate may be carried out by driving the magneto-optical disc 1 at a rotational speed higher than the stationary speed. In this case, the high-speed dubbing can be carried out within the allowable range of the data transmission speed.

What is claimed is:

1. A compressed data recording and/or reproducing apparatus comprising:

a compressed data reproducing system for at least reproducing digital data from one recording medium in which digital data is bit-compressed and recorded;

a compressed data recording system for at least recording digital data in another recording medium in which digital data is bit-compressed and recorded;

the compressed data recorded in said one recording medium of the reproducing system being reproduced and transmitted to the recording system, the compressed data being bit-compressed at the same or a lower bit rate and recorded in said another recording medium;

wherein the compressed data reproduced by the reproducing system is directly transmitted or further compressed, without being expanded, so as to be transmitted to the recording system, and is recorded in the recording medium;

wherein the compressed data is recorded with the processing block of the bit compression being selectively deleted by means of a parameter of the bit compression.

2. The compressed data recording and/or reproducing apparatus as claimed in claim 1, wherein the compressed data is recorded with the processing block of the bit compression being selectively deleted by means of a scale factor of the bit compression.

3. The compressed data recording and/or reproducing apparatus as claimed in claim 2, wherein, when the scale factor for the processing block of the bit compression is equal to or greater than a certain standard value, the compressed data is recorded with at least part of the processing block being deleted.

4. The compressed data recording and/or reproducing apparatus as claimed in claim 3, wherein, when the scale factor of the bit compression is equal to or greater than a certain standard value across at least three consecutive processing blocks on a time axis, the compressed data is recorded with the processing block(s) except processing blocks on both ends of the consecutive processing blocks being deleted.

5. The compressed data recording and/or reproducing apparatus as claimed in claim 1, 2, 3 or 4, wherein the compressed data is recorded in said another recording medium with part of the processing block being deleted by means of a scale factor of the bit compressed data reproduced from said one recording medium.

6. The compressed data recording and/or reproducing apparatus as claimed in claim 1, 2, 3 or 4, wherein the compressed data recorded in said another recording medium is reproduced with part of the processing block is deleted by means of a scale factor of the bit compressed data.

7. The compressed data recording and/or reproducing apparatus as claimed in claim 1, 2, 3 or 4, wherein said one recording medium is selected from a magnetic disc, an optical disc, a magneto-optical recording/reproducing disc, and a phase-change optical recording/reproducing disc, while said another recording medium is an IC memory.

8. The compressed data recording and/or reproducing apparatus as claimed in claim 7, wherein said another recording medium is an IC memory card.

9. The compressed data recording and/or reproducing apparatus as claimed in claim 1, 2, 3 or 4, wherein the bit compression is such that, after signals divided in frequency into plural frequency bands are orthogonally transformed, an orthogonal transform coefficient is processed by block floating and quantization.

10. The compressed data recording and/or reproducing apparatus as claimed in claim 9, wherein the division into plural frequency bands is such that a frequency band becomes broader in a direction of increasing frequency.

11. The compressed data recording and/or reproducing apparatus as claimed in claim 1, 2, 3 or 4, wherein a bit rate of compressed data for said one recording medium and said another recording medium is constant on a real-time base.

12. The compressed data recording and/or reproducing apparatus as claimed in claim 1, 2, 3 or 4, wherein the compressed data recorded in said one recording medium is reproduced with part of the processing block being deleted by means of a scale factor of the bit-compressed data.

13. The compressed data recording and/or reproducing apparatus as claimed in claim 1, 2, 3 or 4, wherein the number of deleted bit compression processing blocks is recorded.

14. The compressed data recording and/or reproducing apparatus as claimed in claim 13, wherein the number of the deleted bit compression processing blocks is read out from a block having no bit-compressed data written therein, thus reproducing a silent portion.

15. The compressed data recording and/or reproducing apparatus as claimed in claim 6, wherein the compressed data is reproduced with a silent portion of a constant length being inserted therein instead of the deleted bit compression processing block.

16. The compressed data recording and/or reproducing apparatus as claimed in claim 5, wherein the compressed data recorded in said another recording medium is reproduced with part of the processing block being deleted by means of a scale factor of the bit-compressed data.

17. The compressed data recording and/or reproducing apparatus as claimed in claim 5, wherein said one recording medium is selected from a magnetic disc, an optical disc, a magneto-optical recording/reproducing disc, and a phase change optical recording/reproducing disc, while said another recording medium is an IC memory.

18. The compressed data recording and/or reproducing apparatus is claimed in claim 6, wherein said one recording medium is selected from a magnetic disc, an optical disc, a magneto-optical recording/reproducing disc, and a phase change optical recording/reproducing disc, while said another recording medium is an IC memory.

19. The compressed data recording and/or reproducing apparatus as claimed in claim 5, wherein the bit compression is such that, after signals divided in frequency into plural frequency bands are orthogonally transformed, an orthogonal transform coefficient is processed by block floating and quantization.

20. The compressed data recording and/or reproducing apparatus as claimed in claim 6, wherein the bit compression is such that, after signals divided in frequency into plural frequency bands are orthogonally transformed, an orthogonal transform coefficient is processed by block floating and quantization.

21. The compressed data recording and/or reproducing apparatus as claimed in claim 10, wherein the bit compression is such that, after signals divided in frequency into plural frequency bands are orthogonally transformed, an orthogonal transform coefficient is processed by block floating and quantization.

22. The compressed data recording and/or reproducing apparatus as claimed in claim 8, wherein the bit compression is such that, after signals divided in frequency into plural frequency bands are orthogonally transformed, an orthogonal transform coefficient is processed by block floating and quantization.

23. The compressed data recording and/or reproducing apparatus as claimed in claim 5, wherein the compressed data recorded in said one recording medium is reproduced with part of the processing block being deleted by means of a scale factor of the bit-compressed data.

24. The compressed data recording and/or reproducing apparatus as claimed in claim 5, wherein the number of deleted bit compression processing blocks is recorded.

25. A compressed data recording and/or reproducing method for reproducing digital data from one recording medium in which digital data is bit-compressed and recorded, and for recording the digital data in one another recording medium in which digital data is bit-compressed and recorded, the method comprising:

bit-compressing and recording the compressed data reproduced from said one recording medium in said another recording medium at the same or a lower bit rate;

wherein the reproduced compressed data is directly recorded or further compressed, without being expanded, so as to be recorded in said another recording medium; and wherein the compressed data is recorded with the processing block of the bit compression being selectively deleted by means of a parameter of the bit compression.

26. The compressed data recording and/or reproducing method as claimed in claim 25, wherein the compressed data is recorded with the processing block of the bit compression being selectively deleted by means of a scale factor of the bit compression.

27. The compressed data recording and/or reproducing method as claimed in claim 26, wherein, when the scale factor for the processing block of the bit compression is equal to or greater than a certain standard value, the compressed data is recorded with at least part of the processing block being deleted.

28. The compressed data recording and/or reproducing method as claimed in claim 27, wherein, when the scale factor of the bit compression is equal to or greater than a certain standard value across at least three consecutive processing blocks on a time axis, the compressed data is recorded with the processing block except processing blocks on both ends of the consecutive processing blocks being deleted.

29. The compressed data recording and/or reproducing apparatus as claimed in claim 15, wherein the compressed data is reproduced with a silent portion of a constant length being inserted therein instead of the deleted bit compression processing block.

* * * * *